United States Patent
Heidemann et al.

(10) Patent No.: US 7,376,655 B2
(45) Date of Patent: May 20, 2008

(54) METHOD AND DATA PROCESSING DEVICE FOR COMMISSIONING MANUFACTURING EXECUTION SYSTEM (MES) COMPONENTS

(75) Inventors: Lüder Heidemann, Erlangen (DE); Jan Scheer, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 374 days.

(21) Appl. No.: 10/482,788

(22) PCT Filed: Jun. 21, 2002

(86) PCT No.: PCT/DE02/02285

§ 371 (c)(1),
(2), (4) Date: Jan. 2, 2004

(87) PCT Pub. No.: WO03/005138

PCT Pub. Date: Jan. 16, 2003

(65) Prior Publication Data

US 2004/0177055 A1   Sep. 9, 2004

(30) Foreign Application Priority Data

Jul. 2, 2001  (DE) ............................... 101 31 956

(51) Int. Cl.
*G06F 17/30* (2006.01)

(52) U.S. Cl. .......................... 707/100; 707/2; 715/514

(58) Field of Classification Search ................ 707/100, 707/200, 1, 2; 715/514–516, 500, 505
See application file for complete search history.

(56) References Cited

U.S. PATENT DOCUMENTS

| | | | |
|---|---|---|---|
| 5,835,922 A * | 11/1998 | Shima et al. | 715/522 |
| 6,141,647 A | 10/2000 | Meijer et al. | 705/1 |
| 6,944,662 B2 * | 9/2005 | Devine et al. | 709/225 |
| 6,965,895 B2 * | 11/2005 | Smith et al. | 707/10 |

FOREIGN PATENT DOCUMENTS

JP  0144453  5/1998

OTHER PUBLICATIONS

Weygandt, "Getting the MES model-methods for system analysis", ISA Transactions, 1995, vol. 35, pp. 95-103.

* cited by examiner

*Primary Examiner*—Cheryl Lewis
(74) *Attorney, Agent, or Firm*—Staas & Halsey LLP

(57) ABSTRACT

Relevant data is extracted from engineering or system documents. The data is represented by a given hierarchical system structure in a predetermined system characteristic structure. The hierarchical system structure is loaded onto an MES-component to enable it to become operational. References to the original engineering or system documents are loaded onto the MES-components to enable navigation of the documents inside the MES-component.

6 Claims, 5 Drawing Sheets

METHOD AND DATA PROCESSING DEVICE FOR COMMISSIONING MANUFACTURING EXECUTION SYSTEM (MES) COMPONENTS

CROSS REFERENCE TO RELATED APPLICATIONS

This application is based on and hereby claims priority to German Application No. 10131956.8 filed on Jul. 2, 2001, the contents of which are hereby incorporated by reference.

BACKGROUND OF THE INVENTION

1. Field of the Invention

The invention relates to a method and a data processing device for commissioning MES components, particularly maintenance management components.

2. Description of the Related Art

"Software für die Automatisierung—Transparenz über die Abläufe schaffen" (which can be translated as "Software for automation—providing transparency through the sequences"), an article by Dirk Kozian in Elektronik für die Automatisierung 11, Nov. 17, 1999 discloses the practice of using "manufacturing execution systems" (MES) for automating production and manufacturing sequences. These systems integrate the automation level (Controls) with the ERP (Enterprise Resource Planning) systems on the enterprise command level. Manufacturing execution systems are systems which provide information for optimizing production sequences, for example. First, the manufacturing execution systems need to add installation-specific, current fine planning data to the ERP system's coarse planning data and forward these fine planning data to the subordinate automation level as appropriate, and secondly they have the task of adopting production-related information from the automation level, editing this information and reporting it further to the enterprise command level. MES systems thus perform the task of vertical integration between the enterprise command level and the automation level. Typical individual tasks of MES systems are enterprise asset management, maintenance management, information management, scheduling, dispatching and trace & track. These tasks are each performed by MES components. In order for an MES component to be able to operate, it requires information about other components or possibly also about the overall structure of the installation. Today, this information is generally input manually into the MES components by the system integrator or the commissioner. The information about the installation structure is usually contained in engineering documents (e.g. P&ID, Pipe & Instrument Diagram or measurement point lists).

JP 0144453 discloses the practice of generating a list of equipment information for installations from the graphical information in P&ID diagrams.

U.S. Pat. No. 6,141,647 discloses a system and a method for integrating a business environment, i.e. a business management environment, an automation environment and a laboratory environment.

DE 199 48 028 A1 describes a method and a system for optimizing the sending of requests in workflow management systems.

SUMMARY OF THE INVENTION

It is therefore an object of the invention to provide a method and a system for automatically commissioning MES components, where the MES components are loaded with information about the hierarchical installation structure.

In this case, the inventors' starting point was the knowledge that all the information required for operating MES components is held in the engineering documents and that these documents can be used to derive the hierarchy of the installation structure. In addition, the inventors' starting point was the knowledge that a hierarchic installation structure which explicitly identifies subinstallations or subcomponents is an optimum information-technology basis for commissioning and for operating MES components.

The invention achieves the aforementioned object for a method for commissioning MES components, particularly maintenance management components, by performing operations in the following sequence:

a) relevant data are extracted from engineering documents,
b) the relevant data are combined to form at least one document or one file,
c) the information in these documents or files is mapped into a hierarchic installation structure on the basis of a prescribable installation identification structure,
d) this hierarchic installation structure is loaded into the respective MES component.

This method described relieves the load on the system integrator or the commissioner of an installation. An MES component, e.g. a maintenance component, which is to be commissioned on an installation is normally completely empty. To make, by way of example, a maintenance component sufficiently operational for it to be of benefit to the customer, all the installation objects which there actually are (an installation can have approximately 10 000 or 100 000 or more installation objects) need to be created, i.e. instantiated. If this instantiation is now intended to take place manually, then this is firstly a very time consuming method and secondly the risk of manual recording errors is very high. The inventive method now involves MES components being filled automatically, as a result of which the quality of this operation is increased. If the engineering documents from which the relevant data are extracted now also contain information regarding the maintenance of the installation (e.g. in which time cycles does a motor need to be serviced and lubricated?), then a maintenance component, for which this maintenance information is very important, is immediately ready for use.

A first refinement of the present invention involves references to the engineering documents and/or contents of the engineering documents also being mapped into the hierarchic installation structure and being loaded onto the MES component. As a result of references to the original documents and also contents of the original source documents also being loaded onto the MES component, it is possible to navigate in these source documents as well. As a result of these source documents also being automatically incorporated, the operator of an MES component is also provided with support, since he has direct access to the original documentation. Direct access to the original documentation is also advantageous for the maintenance planner, the maintenance performer, the factory manager or an engineer who needs to modify an installation, however, since this original documentation can be accessed more or less online.

Another advantageous refinement of the invention involves the relevant data and/or parts of the relevant data being mapped onto attributes of the objects in the hierarchic installation structure. This increases flexibility for the commissioner.

Another advantageous refinement of the invention involves the specification for the mapping of the information being parameterizable. The ability to parameterize the mapping specification has two advantages: first, a hierarchic installation structure is generated from the import document's linear list on the basis of an installation identification system (there are various standards for installation identification systems, e.g. the KKS standard for the power plant sector) on the basis of the underlying installation identification system, and secondly it is necessary to stipulate how an installation object from the import document is mapped onto an object type in the MES component (e.g. it is necessary to stipulate which attribute from the import document is mapped onto a corresponding object or onto corresponding attributes in the MES component). If this mapping information is parameterizable and can be changed without any great programming complexity, perhaps can even be changed graphically, then this increases the flexibility and convenience for commissioning.

Another advantageous refinement for an inventive data processing device involves a first device extracting relevant data from prescribable engineering documents, a second device combining the relevant data, and involves a third device mapping these combined data into a hierarchic installation structure on the basis of a prescribable installation identification structure, with this hierarchic installation structure being loaded into the MES component by a loading device. This means that MES components are no longer loaded manually but rather automatically. This firstly increases the efficiency of the commissioning operation and secondly lowers the susceptibility to error during data input.

Another advantageous refinement of the invention is provided by virtue of the third device mapping the engineering documents and/or references to the engineering documents into the hierarchic installation structure and loading them into the MES component. The fact that the original documents are automatically incorporated as well means that direct, consistent access to this documentation is possible. The quality feature "Information at your fingertips" is supported by this refinement. This is advantageous for the system integrator, the maintenance planner, the maintenance performer or an engineer who needs to modify the installation.

Another advantageous refinement of the present invention involves the third device mapping the relevant data and/or parts of the relevant data onto attributes of the objects in the hierarchic installation structure. Besides methods as an important part, inter alia, programming-language and information-technology objects also contain attributes which identify and describe the objects more closely. Mapping relevant installation data or parts thereof onto these attributes makes the objects more realistic for a user. That is to say that this makes representation of specific installation components by information-technology objects more transparent and more comprehensible.

Another advantageous refinement of the present invention involves a fourth device being provided which is used to define the installation identification structure and/or to define and carry out the mapping of parts of the relevant data and/or the mapping of the relevant data onto attributes of the objects in the installation structure. This allows the underlying installation identification structure to be changed very easily, and also the mapping of relevant data or the mapping of parts of relevant data onto attributes of the objects permits flexibility for the operator and, as a result of the mapping specification being defined in the installation structure, convenient handling of this mapping specification is achieved for the operator.

Another advantageous refinement of the invention involves the loading device being integrated in the third device. This allows compact implementation of the system.

Another advantageous refinement of the invention involves the first device and the second device being provided by a single device. This also allows or improves the compact implementation of the system.

Another advantageous refinement of the present invention involves the first device, the second device and the third device being provided by a single device. This also allows compact implementation of the system.

Another advantageous refinement of the present invention involves the third device being integrated in the second device and/or the first device. This also allows compact implementation of the system.

Another advantage refinement of the present invention involves the fourth device being integrated in the third device.

Another advantageous refinement of the present invention involves the mapping specification for mapping the relevant data and/or mapping parts of the relevant data onto attributes of the objects in the hierarchic installation structure being parameterizable. This increases the flexibility for the operator, and, in particular, the existing system can very easily be used or changed over for different installations or installation types.

Another advantageous refinement of the present invention involves the inventive method being implemented by a computer program. This makes it a simple matter to make any modifications or adjustments.

Another advantageous refinement of the present invention involves the computer program for the inventive method being stored on a data storage medium. This makes the method easily manageable in terms of logistics and distribution.

Another advantageous refinement of the present invention involves the computer program for the inventive method being installed on a data processing device. This increase the performance.

An exemplary embodiment of the invention which also reveals further advantages is shown in the drawing and is explained below.

BRIEF DESCRIPTION OF THE DRAWINGS

These and other objects and advantages of the present invention will become more apparent and more readily appreciated from the following description of the preferred embodiments, taken in conjunction with the accompanying drawings of which.

Figure 1:
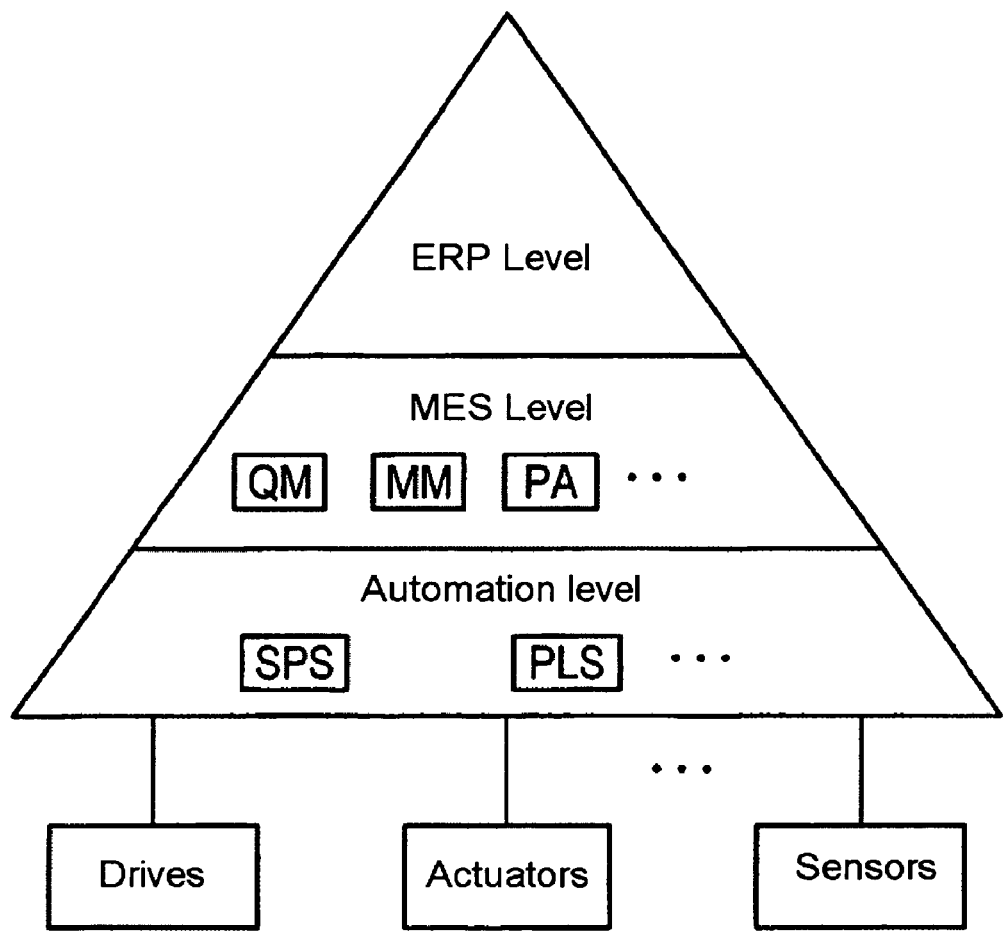
FIG. 1 is a block diagram providing an overview of the "enterprise pyramid" with three control levels.

DETAILED DESCRIPTION OF THE
PREFERRED EMBODIMENT

Reference will now be made in detail to the preferred embodiments of the present invention, examples of which are illustrated in the accompanying drawings, wherein like reference numerals refer to like elements throughout.

The illustration shown in FIG. 1 shows an overview of the three control levels, as can normally be found in a production or manufacturing enterprise. The pyramid shape expresses that the information is compressed toward the top. The top level is the ERP (Enterprise Resource Planning) level. This enterprise command level is where the business management and sales tasks are normally performed in an enterprise (e.g. finance, sales, personnel, reporting). Logistical tasks across production installations (e.g. order and material management) are also performed on this level, however. The SAP R/3 system is an ERP system which is used very frequently on the enterprise command level.

The bottom level of the pyramid is the automation level (Controls). This level normally sees the use of programmable logic controllers (PLCs) in conjunction with visualization and process control systems (PCSs). The drives, actuators and sensors in the production and/or manufacturing facilities are connected directly to the systems on this level.

The link between the ERP level and the automation level is formed by the MES level. The applications on the MES level thus ensure vertical integration between the ERP level and the automation level. The MES applications first have to complement the ERP systems' coarse planning with production-installation-specific fine planning and to forward this planning to the systems on the automation level, and secondly it is the task of the MES applications to receive production-related data from the automation level, to edit them and to forward them to the ERP level (enterprise command level).

Typical MES applications are, inter alia, quality management (QM), maintenance management (MM), performance analysis (PA), process management, labor management, asset management. In FIG. 1, three dots respectively express that a level can hold other elements (applications, systems etc.).

Figure 2:
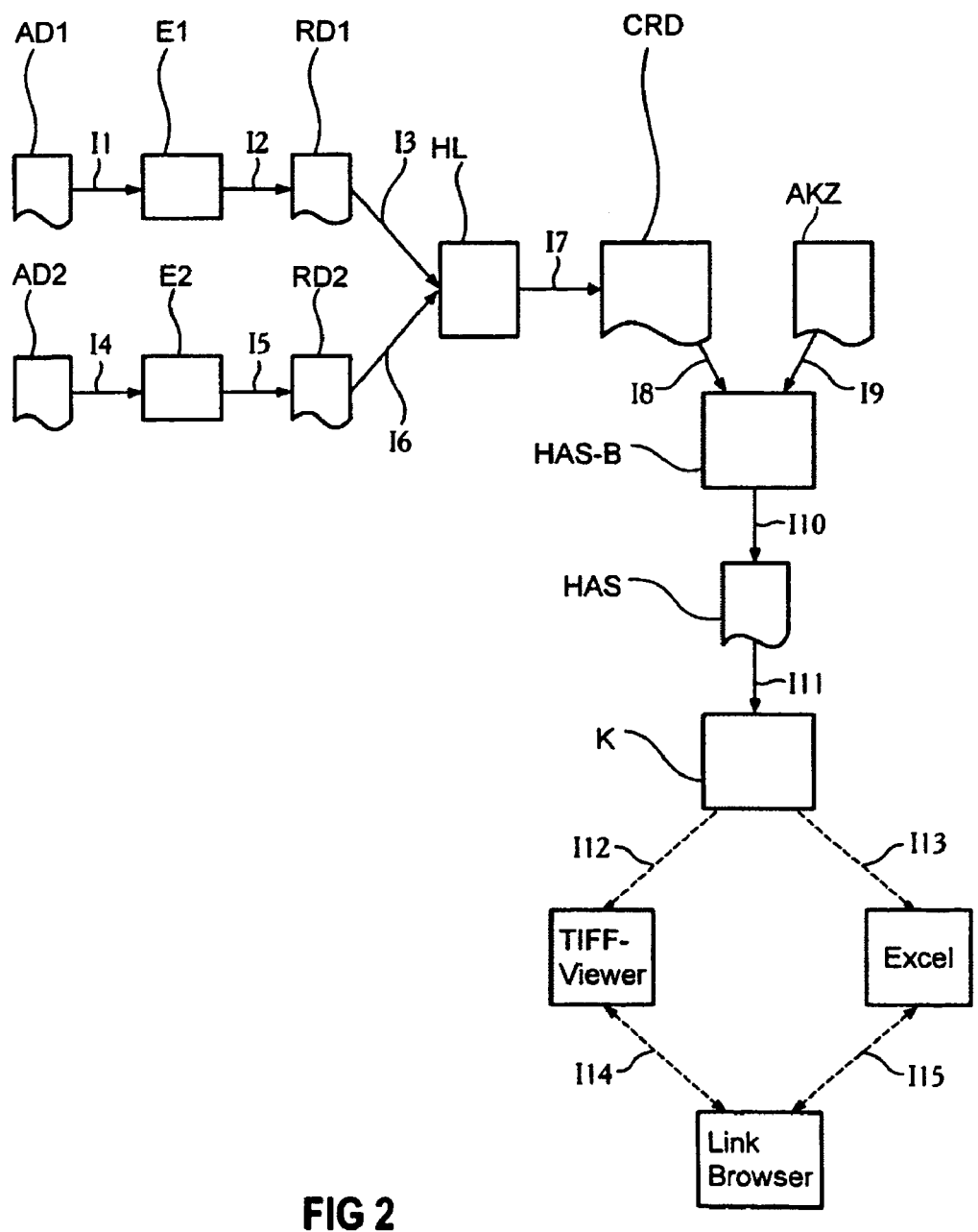
FIG. 2 is a flow diagram providing an overview of the design of the inventive system.

The illustration in FIG. 2 shows an overview of the design of the inventive system. The starting point is the engineering and installation documents AD1, AD2. These engineering documents can be available in different formats or forms. They can be text documents, graphics documents or else mixed documents. Typical engineering documents for creating installations are, by way of example, the Pipe & Instrument Diagrams or else measurement point lists. Extractors E1, E2 are used to extract the relevant data RD1, RD2 from these documents and to store them in lists. Since the installation documents can be available in different types or formats, the means for extraction E1, E2 can also be produced separately, i.e. depending on the type of document, or else an extractor E1, E2 can exist which is able to extract the relevant data for different types of installation documents. It is conceivable that the extractors are in a form such that they automatically identify what type of document they are currently handling.

Relevant data are, by way of example, information regarding how an installation is designed, i.e. which subinstallations make up an installation or which subcomponents make up an installation, etc. The relevant data RD1, RD2 are combined using a hyperlinker HL to form a common list CRD. It is advantageous to use XML (eXtensible Markup Language) for the format of the lists of relevant data RD1, RD2 and for the format of the common list CRD. XML is a metalanguage in which new elements can be defined at any time. In addition, XML can be transmitted using the same channels as HTML (Hyper Text Markup Language) and also an increasing number of XML-based standards are being produced, such as SOAP (Simple Object Access Protocol). For the lists, it is alternatively possible to use other formats, such as ASCII or HTML.

In the depiction in FIG. 2, the solid arrows I1 to I11 represent flows of information or data. The flow of information I1 from the installation document AD1 to the extractor E1 shows that the installation document is an input for the extractor E1. The arrow I2 starting from the extractor E1 and pointing to the relevant RD1 shows that the relevant data RD1 are an output from the extractor E1. The combined relevant data CRD and the installation identification structure AKZ are an input for the HAS builder HAS-B (HAS is the German acronym for hierarchic installation structure). The arrows I8 and I9 show this input relationship with the HAS builder. In the HAS builder HAS-B a hierarchic installation structure HAS is generated from the CRD list on the basis of the underlying AKZ (installation identification structure). This hierarchic installation structure is usually shown as a tree structure with an installation, subinstallations, subcomponents etc. (see FIG. 3). The arrow I10 indicates that the hierarchic installation structure HAS is an output from the HAS builder, and the information arrow I11 shows that the hierarchic installation structure is an input for the MES component K. The hierarchic installation structure HAS can be loaded onto the MES component K by a separate loading device, but it is also conceivable for the loading device to be part of a HAS builder and hence not to be in the form of a separate device. In addition, it is also conceivable for the hyperlinker HL to be integrated in the or in an extractor. This is appropriate particularly if an extractor is able to handle a number of types of documents.

The information about the installation identification structure AKZ can be communicated to the HAS builder HAS-B in hardwired form, but it is also possible for another device to be provided which is used to define the installation identification structure. Hence, the information about the installation identification structure can be parameterized and can be introduced very flexibly. It is also conceivable for, by way of example, this further device or the HAS builder also to be used to define the mapping specification, how the relevant data or parts thereof are mapped onto attributes of the objects in the installation structure. It also increases the flexibility for the operator or the system integrator, for example. In addition, flexibility is increased by virtue of references to the engineering documents and/or contents of the engineering documents also being mapped into the hierarchic installation structure and being loaded onto the corresponding MES component. This is shown in FIG. 2 by the dashed arrows I12 and I13. I12 refers to a Tiff viewer so that Tiff documents can be viewed. I13 refers to Excel tables so as to ensure access to these Excel tables as well. To ensure convenient navigation in these documents directly from the MES component, the documents can be viewed using a link browser, as shown in FIG. 2 by the arrows I14 and I15. This allows very simple and convenient navigation and browsing in a wide variety of documents, regardless of whether they are text documents or graphics documents.

The method or system described in line with the invention is particularly suitable for MES components which require a full overview of an installation in order to operate. However, the method or the system is also suitable for rapidly commissioning MES components which require just partial information from installations in order to operate.

Figure 3:
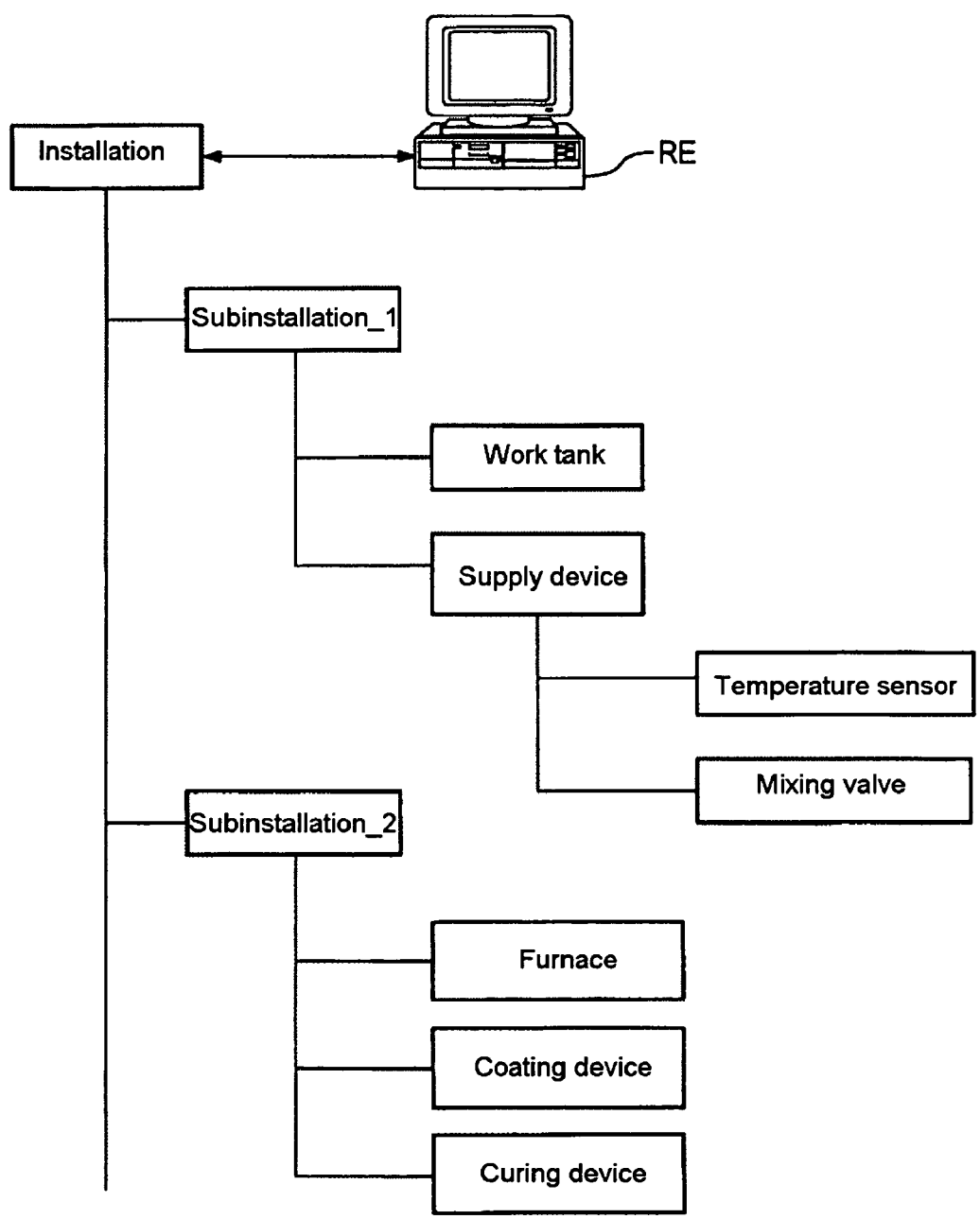
FIG. 3 is a block diagram providing an example of a hierarchic installation structure.

The illustration shown in FIG. 3 shows a hierarchic installation structure (HAS; FIG. 2) as a tree diagram. The information required in order to create or to generate such an hierarchic installation structure has been obtained from the engineering or installation documents (AD1, AD2; FIG. 2). This hierarchic installation structure is loaded onto the MES components (K; FIG. 2) so that the MES components become ready for operation.

FIG. 3 shows, by way of example and in the form of an overview, an installation which has two subinstallations, subinstallation_1 and subinstallation_2, with the subinstallation_1 having a work tank and a supply device. In addition, the supply device includes the two subcomponents: a temperature sensor and a mixing valve. It is indicated that the subinstallation_2 includes three further subcomponents: a furnace, a coating device and a curing device. The entire installation can contain further subinstallations, as indicated by three dots at the bottom left hand margin of the picture.

An installation tree, as shown by way of example in FIG. 3, is represented by the list of combined relevant data (CRD; FIG. 2). The objects in the CRD list represent the elements and the structure of the underlying installation. The objects normally contain, inter alia, methods and attributes which are used to define their properties and their behavior.

The top part of FIG. 3 shows that the installation is bidirectionally connected (shown by a bidirectional horizontal arrow) to a computer device RE. The computer device normally contains a display apparatus (e.g. one or more monitors) and control elements (keyboard, mouse etc.). The computer device RE can run, inter alia, systems for controlling and observing, systems for engineering or MES applications.

Figure 4:
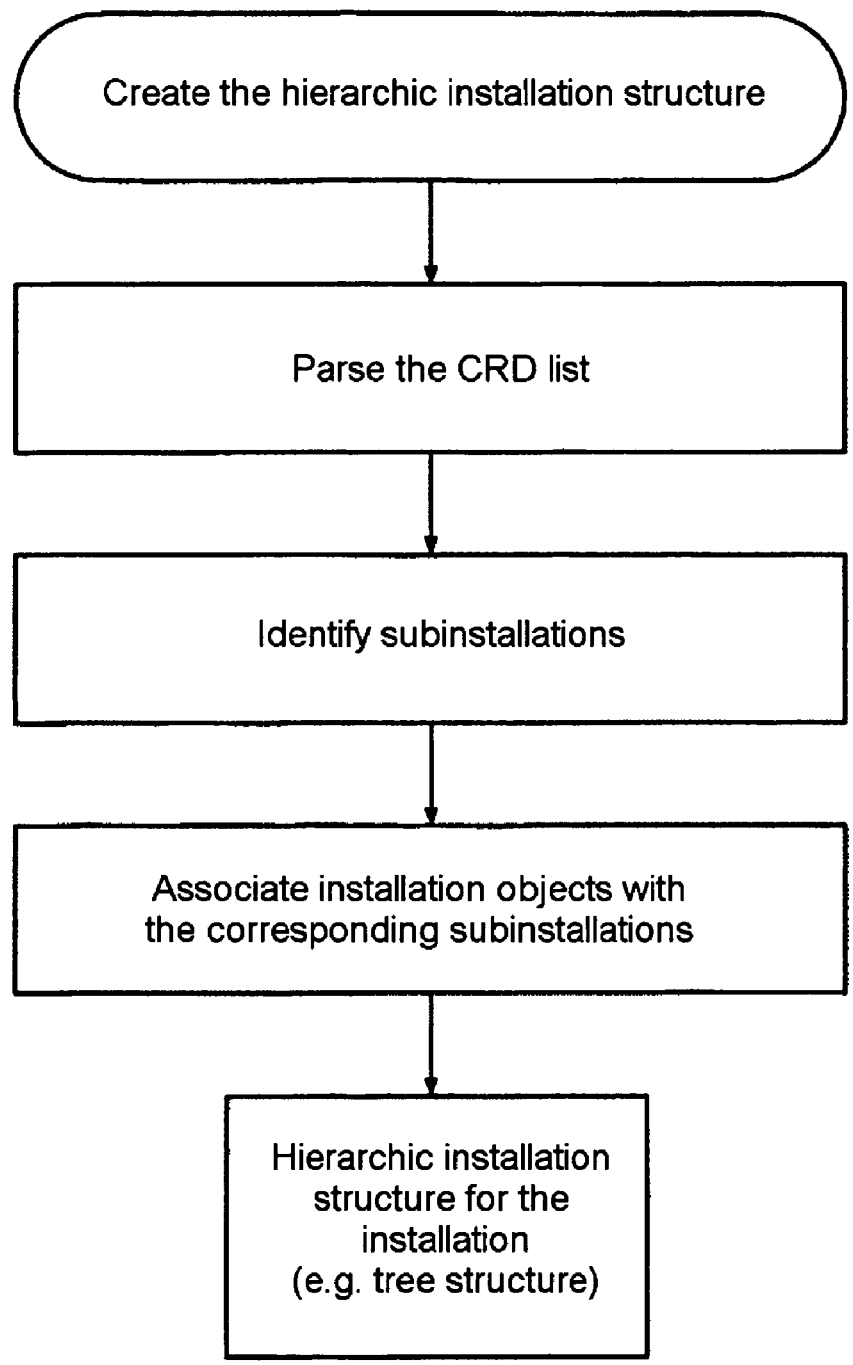
FIG. 4 is a coarse flowchart for the creation of the hierarchic installation structure.

The illustration shown in FIG. 4 shows in a coarse flowchart how the hierarchic installation structure (HAS; FIG. 2) for the installation is generated. The starting point for creating the hierarchic installation structure is the list of combined relevant data (CRD; FIG. 2) and the installation identification structure (AKZ; FIG. 2) on which the installation is based. The CRD list contains all the data which are relevant from the engineering and installation documents (AD1, AD2; FIG. 2). Normally, for the CRD list the relevant data are combined using a hyperlinker HL; FIG. 2), since the relevant data can be obtained from different types of documents, e.g. from PDF documents or from graphics documents. The installation identification structure (AKZ; FIG. 2) stipulates how the individual elements of the CRD list need to be interpreted. For the installation identifiers, there are various standards, such as the KKS standard for the power plant sector, and for production installations there are DIN standards.

The CRD list provided is processed step by step (Parse the CRD list) and the individual installation identifiers for the individual list elements reveal whether subinstallations, subcomponents or other installation objects exist. The installation objects found are then associated with the corresponding subcomponents or subinstallations.

In this way, a hierarchic installation structure is systematically created, usually in a tree structure. If the respective underlying installation identification structure (AKZ; FIG. 2) can be supplied to the algorithm as a freely allocatable parameter, then such a hierarchic installation structure can be created very flexibly for different installation types. This hierarchic installation structure is then loaded onto the MES component (K; FIG. 2) so that the latter can be started up.

The algorithm abstractly outlined in FIG. 4 can be executed on the HAS builder (HAS-B; FIG. 2), for example.

Figure 5:
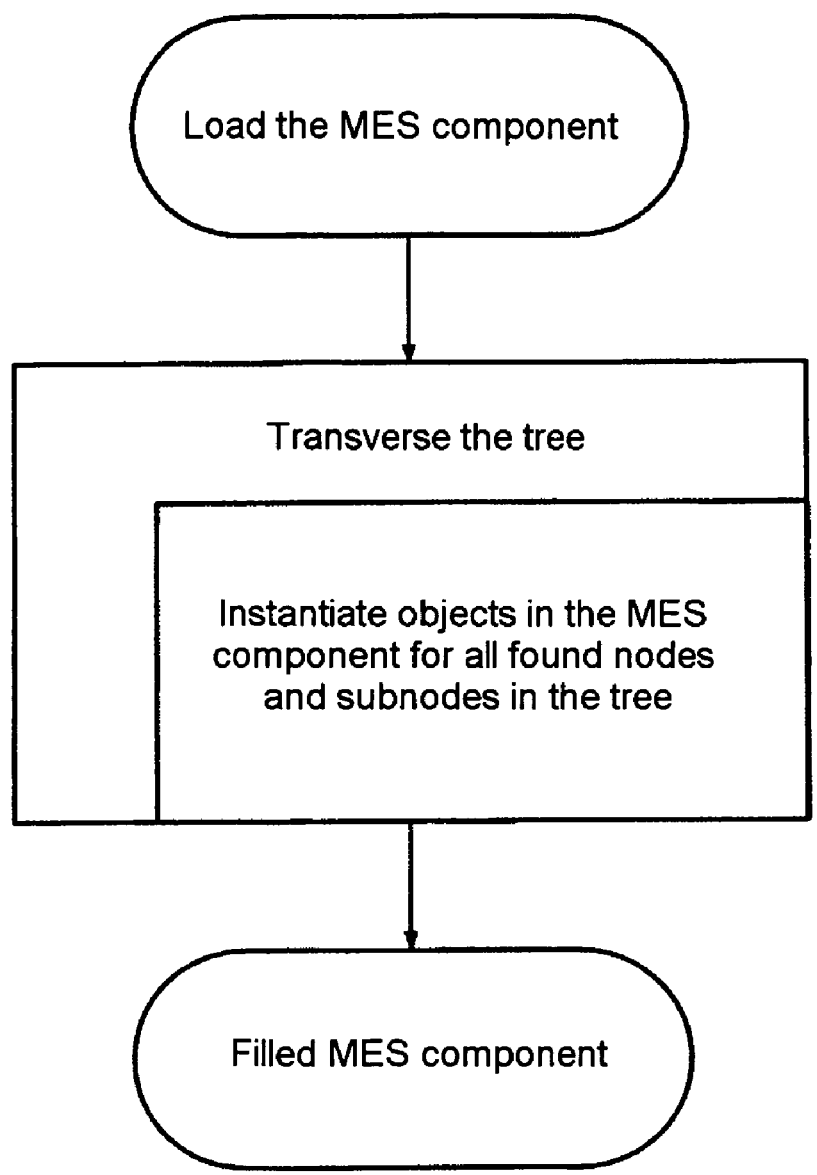
FIG. 5 is a coarse flowchart for the loading of the hierarchic installation structure onto the MES component.

The illustration shown in FIG. 5 shows a coarse flowchart illustrating how an MES component (K; FIG. 2) is loaded. The installation's hierarchic installation structure (HAS; FIG. 2) is normally available in a tree structure. The tree is accessed using a traversing algorithm, as described in E. Denert, R. Frank, Datenstrukturen (which can be translated as "Data Structures"), BI-Wissenschaftsverlag, 1977, for example. If the algorithm hits a node or subnode while the tree is being traversed, a respective object is instantiated in the MES component for all these nodes or subnodes which have been found. When corresponding objects have been insubstantiated in the MES component for all the nodes and subnodes in the tree, the loading operation is complete and the filled MES component is available. Such a filled MES component is ready for operation.

The algorithm abstractly outlined in FIG. 5 can be executed on the HAS builder (HAS-B; FIG. 2) for example.

Relevant data (RD1, RD2; FIG. 2) are extracted from engineering and installation documents (AD1, AD2; FIG. 2). These data are mapped into a hierarchic installation structure (HAS; FIG. 2) using a prescribed installation identification structure (AKZ; FIG. 2). This hierarchic installation structure is loaded onto the MES component (K; FIG. 2), which thus becomes ready for operation. References to the original engineering and installation documents (AD1, AD2; FIG. 2) are also loaded onto the MES component (K; FIG. 2), and hence navigation in these documents becomes possible within the MES component.

The inventive method and system are particularly suitable for MES components or automation components which require an overview (or information) relating to other components or relating to the entire structure of an installation, e.g. the dispatching system.

The subject matter of the invention can be used in manufacturing and/or production and/or process automation and can, in principle, also be used for ERP components and/or automation components.

The inventive system and method described above can be implemented as a computer program in languages which are known for this purpose. A computer program implemented in this manner can be stored and transported using electronic data paths, but also on data storage medium, in a manner which is likewise known.

The invention has been described in detail with particular reference to preferred embodiments thereof and examples, but it will be understood that variations and modifications can be effected within the spirit and scope of the invention.

The invention claimed is:

1. A method for commissioning maintenance management components in a manufacturing execution system utilizing computer hardware to perform said method, comprising:
    extracting relevant data from engineering documents;
    combining the relevant data to form at least one of at least one document and at least one file;
    mapping at least one of references to and contents of the at least one of at least one document and at least one file into a hierarchic installation structure based on a prescribable installation identification structure; and
    loading the hierarchic installation structure, including the at least one of references and contents, into a corresponding maintenance management component of the manufacturing execution system.

2. The commissioning method as claimed in claim 1, wherein at least parts of the relevant data are mapped onto attributes of objects in the hierarchic installation structure.

3. The commissioning method as claimed in claim 2, wherein said mapping has a parameterizable specification for the information.

4. At least one computer readable medium storing instructions for controlling a processor to perform a method for commissioning maintenance management components in a manufacturing execution system, the method comprising:
extracting relevant data from engineering documents;
combining the relevant data to form at least one of at least one document and at least one file;
mapping at least one of references to and contents of the at least one of at least one document and at least one file into a hierarchic installation structure based on a prescribable installation identification structure; and
loading the hierarchic installation structure, including the at least one of references and contents into a corresponding maintenance management component of the manufacturing execution system.

5. The least one computer readable medium as claimed in claim 4, wherein at least parts of the relevant data are mapped onto attributes of objects in the hierarchic installation structure.

6. The least one computer readable medium as claimed in claim 5, wherein said mapping has a parameterizable specification for the information.

* * * * *